United States Patent
Bamford et al.

(10) Patent No.: US 9,569,071 B2
(45) Date of Patent: *Feb. 14, 2017

(54) METHOD AND APPARATUS FOR OPERATING GRAPHIC MENU BAR AND RECORDING MEDIUM USING THE SAME

(71) Applicant: HTC Corporation, Taoyuan County (TW)

(72) Inventors: Drew Bamford, Bellevue, WA (US); Micah Shotel, Bellevue, WA (US)

(73) Assignee: HTC Corporation, Taoyuan (TW)

( * ) Notice: Subject to any disclaimer, the term of this patent is extended or adjusted under 35 U.S.C. 154(b) by 226 days.

This patent is subject to a terminal disclaimer.

(21) Appl. No.: 14/578,511

(22) Filed: Dec. 22, 2014

(65) Prior Publication Data

US 2015/0143296 A1    May 21, 2015

Related U.S. Application Data

(63) Continuation of application No. 13/241,237, filed on Sep. 23, 2011, now Pat. No. 8,947,460, which is a continuation-in-part of application No. 12/400,811, filed on Mar. 10, 2009, now abandoned.

(30) Foreign Application Priority Data

Apr. 22, 2008   (TW) ................................ 97114693 A

(51) Int. Cl.
| | | |
|---|---|---|
| G06F 3/048 | (2013.01) | |
| G06F 3/0482 | (2013.01) | |
| G06F 3/0481 | (2013.01) | |
| G06F 3/0488 | (2013.01) | |

(52) U.S. Cl.
CPC ........... *G06F 3/0482* (2013.01); *G06F 3/0488* (2013.01); *G06F 3/04817* (2013.01); *G06F 3/04886* (2013.01)

(58) Field of Classification Search
None
See application file for complete search history.

(56) References Cited

U.S. PATENT DOCUMENTS

| | | |
|---|---|---|
| 5,664,095 A | 9/1997 | Cox et al. |
| 5,748,468 A | 5/1998 | Notenboom et al. |
| 5,778,244 A | 7/1998 | Putnins et al. |
| 5,841,763 A | 11/1998 | Leondires et al. |
| 6,845,414 B2 | 1/2005 | Hsu et al. |
| 2008/0201716 A1 | 8/2008 | Du et al. |

*Primary Examiner* — Xiao M. Wu
*Assistant Examiner* — Mohammad H Akhavannik
(74) *Attorney, Agent, or Firm* — Jianq Chyun IP Office

(57) ABSTRACT

A method and an apparatus for operating a graphic menu bar and a recording medium using the same, suitable for a portable electronic device having a touch screen, are provided. First, a graphic menu bar is provided, which includes M graphic items arranged in sequence, where M is a positive integer. Next, the touch screen is divided into N display blocks along a coordinate axis direction for displaying N connected graphic items in graphic menu bar, where N is a positive integer smaller than M. When the touch screen detects a touch signal in display blocks and the touch signal is moved toward the coordinate axis direction for a first displacement, the graphic menu bar displayed on the touch screen is moved toward a direction opposite to the coordinate axis direction for a second displacement, and the second displacement is equal to the product of the first displacement and (M−N)/N.

11 Claims, 4 Drawing Sheets

METHOD AND APPARATUS FOR OPERATING GRAPHIC MENU BAR AND RECORDING MEDIUM USING THE SAME

CROSS-REFERENCE TO RELATED APPLICATION

This application is a continuation application of and claims the priority benefit of a prior U.S. application Ser. No. 13/241,237, filed on Sep. 23, 2011, now allowed. The prior U.S. application Ser. No. 13/241,237 is a continuation-in-part application of and claims the priority benefit of U.S. application Ser. No. 12/400,811, filed on Mar. 10, 2009, which claims the priority benefit of Taiwan application serial no. 97114693, filed on Apr. 22, 2008. The entirety of each of the above-mentioned patent applications is hereby incorporated by reference herein and made a part of this specification.

BACKGROUND OF THE APPLICATION

In order to catch up with the quick pace for the modern life of the mass, various portable electronic devices that can be conveniently taken along without occupying a large space have been increasingly developed. For example, a personal digital assistant (PDA) phone not only provides various functions of a conventional communication device, but also enables a user to write a document, send/receive E-mails, browse networks, or use instant messaging software through a built-in windows operation system. That is to say, the portable electronic device may not only be used to make a call, but further provide various diversified functions like a small personal computer. With the rapid progress of the wireless network technique, the applications of such functions are no longer limited by time and space. As for the modern people who stress on efficiency, such communication device has become one of the indispensable tools.

However, considering the outlay requirements for the portable electronic device of being light, thin, short, and small, the volume of the device is quite limited. If it intends to dispose both a screen and a keyboard on the device, the size of the screen has to be reduced. In order to configure a larger screen within a limited space, recently, a touch screen has been developed. The touch screen with a keyboard integrated therein serves as an input interface for the portable electronic device, so as to save the cost for configuring the conventional keyboard and reduce the occupied area.

However, the size of the touch screen on the portable electronic device is still limited. On the contrary, the functions of the portable electronic device are quite diversified. In order to display various function items on a limited screen for the user to select, the mobile phones available from the current market mostly adopt a patterned operation interface, in which various functions are indicated by reduced icons, and the reduced icon are arranged in the touch screen.

FIG. 1 is a schematic view of a conventional graphic operation interface. Referring to FIG. 1, in a graphic operation interface 100, the touch screen is divided into a plurality of display blocks, which are respectively used for displaying various graphic items such as Home 110, Contacts 120, Messages 130, Email 140, Camera 150, Music player 160, Browser 170, Weather 180, Settings 190, and the like. Although such a mode enables the user to clearly see all the functions of the portable electronic device, once the user selects a certain graphic item to enter a corresponding operation interface, he/she cannot switch to other functions, and has no option but returns to the original graphic operation interface 100 for selecting once again, which is inconvenient.

In another method, the graphic items are connected in parallel to form one graphic menu bar, and the graphic menu bar is displayed at a lower part of the screen for the user to select and switch among different functions, and once the graphic item at the lower part is switched, the above operation interface is also switched to the corresponding function, which is conveniently for the user to select different functions randomly. However, the space of the screen is limited, therefore the height and size of the graphic items are both limited and only a part of the graphic items can be displayed at one moment, the user must move the bar to switch to other graphic items. However, when too many graphic items exist, the user must repeatedly move the graphics for many times to switch to the desired graphic item, which is still inconvenient.

SUMMARY OF THE APPLICATION

Accordingly, the present application is directed to a method for operating a graphic menu bar, which is suitable for operating a large number of graphic items in a limited touch area by adjusting the response of the graphic menu bar corresponding to the touch motion.

The present application is also directed to an apparatus for operating a graphic menu bar, which is suitable for quickly selecting the graphic item by detecting a displacement of a touch signal through a touch screen and correspondingly moving the graphic menu bar by a graphic menu bar displaying module according to the detected displacement.

In order to achieve the above or other objectives, the present application provides a method for operating a graphic menu bar, suitable for a portable electronic device having a touch screen, which comprises the following steps. First, a graphic menu bar is provided, which comprises M graphic items arranged in sequence, in which M is a positive integer. Next, the touch screen is divided into N display blocks along a coordinate axis direction, for displaying N connected graphic items in the graphic menu bar, in which N is a positive integer smaller than M. When the touch screen detects a touch signal in the display blocks and the touch signal is moved toward the coordinate axis direction for a first displacement, the graphic menu bar displayed on the touch screen is moved toward a direction opposite to the coordinate axis direction for a second displacement, in which the second displacement is equal to the product of the first displacement and (M−N)/N.

In an embodiment of the present application, when the touch screen detects the touch signal in the display blocks, the method further comprises enlarged displaying a graphic item where the touch signal is located.

In an embodiment of the present application, when the touch signal is terminated, the method comprises executing a function corresponding to the graphic item where the touch signal is located.

In an embodiment of the present application, the coordinate axis direction comprises one of a horizontal direction and a vertical direction, and the portable electronic device comprises one of a mobile phone, a personal digital assistant (PDA), a PDA phone, a navigation device, a car PC, a UMPC, a tablet PC, and a notebook.

The present application further provides an apparatus for operating a graphic menu bar, which comprises a touch screen, a graphic menu bar generating module, and a graphic menu bar displaying module. The touch screen is used for detecting a touch signal. The graphic menu bar generating module is used for generating a graphic menu bar, which comprises M graphic items arranged in sequence, in which M is a positive integer. The graphic menu bar displaying module is used for dividing the touch screen into N display blocks along a coordinate axis direction, displaying N connected graphic items in the graphic menu bar, and moving the graphic menu bar according to the touch signal detected by the touch screen, in which N is a positive integer smaller than M. When the touch screen detects the touch signal in the display blocks and the touch signal is moved toward the coordinate axis direction for a first displacement, the graphic menu bar displayed on the touch screen is moved toward a direction opposite to the coordinate axis direction for a second displacement, in which the second displacement is equal to the product of the first displacement and (M−N)/N.

In an embodiment of the present application, the graphic menu bar displaying module further enlarged displays a graphic item where the touch signal is located.

The present application further provides a recording medium, suitable for recording a computer program. The computer program includes a plurality of program codes, which is loaded into a portable electronic device so that the portable electronic device executes a method for operating a graphic menu bar, and the method comprises the following steps. First, a graphic menu bar is provided, which comprises M graphic items arranged in sequence, in which M is a positive integer. Next, a touch screen of the portable electronic device is divided into N display blocks along a coordinate axis direction for displaying N connected graphic items in the graphic menu bar, in which N is a positive integer smaller than M. When the touch screen detects a touch signal in the display blocks and the touch signal is moved toward the coordinate axis direction for a first displacement, the graphic menu bar displayed on the touch screen is moved toward a direction opposite to the coordinate axis direction for a second displacement, in which the second displacement is equal to the product of the first displacement and (M−N)/N.

The present application adopts an architecture of dividing the touch screen into a plurality of display blocks. Through adjusting the corresponding relation between the displacement of the touch region and that of the display block, the user is enabled to operate a larger number of graphic items within a limited touch area, so as to increase the convenience in operating the portable electronic device.

In order to make the aforementioned and other objects, features, and advantages of the present application comprehensible, preferred embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF THE EMBODIMENTS

Figure 1:
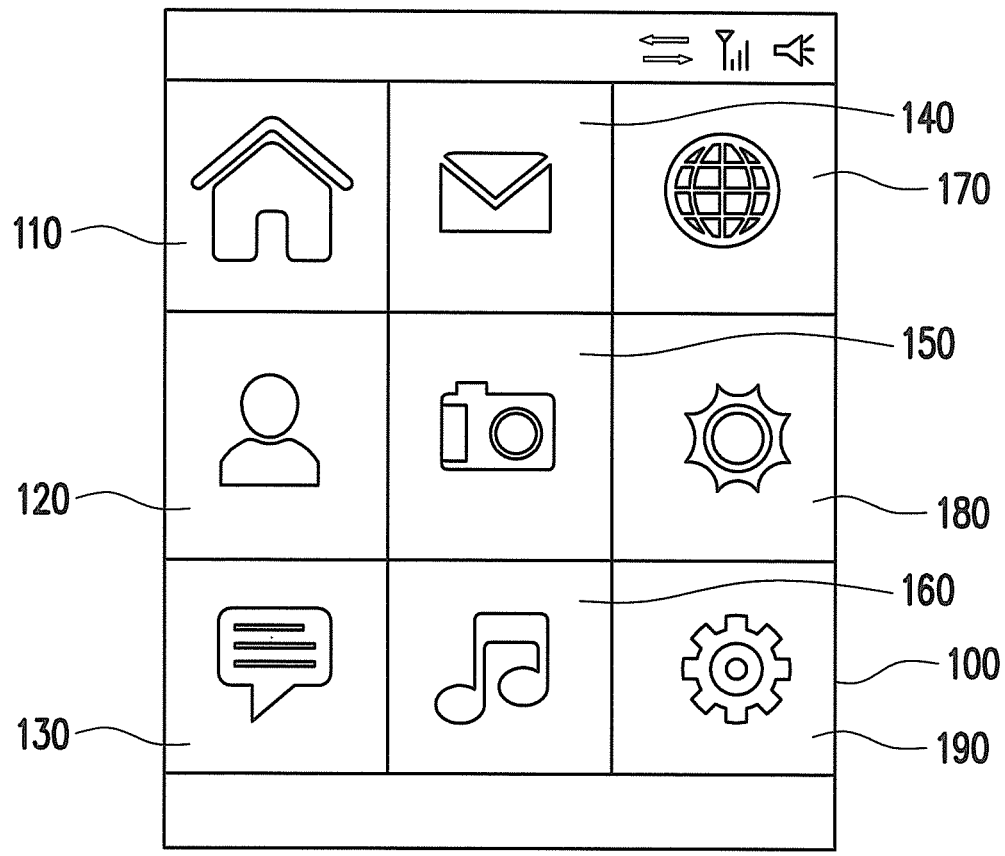
FIG. 1 is a schematic view of a conventional graphic operation interface.

Reference will now be made in detail to the present embodiments of the application, examples of which are illustrated in the accompanying drawings. Wherever possible, the same reference numbers are used in the drawings and the description to refer to the same or like parts.

Since the display area of the touch screen is limited, a part of the graphic menu bar is first displayed on the screen in the present application, and then the graphic menu bar is moved according to the user's touching motion on the touch screen. In addition, in the present application, according to the difference between the touching motion with the human finger and the visual sensitivity of human eyes, a proportional relation between the displacement of the touching motion and that of the graphic menu bar is appropriately adjusted, such that the user can view all the graphic items with only one touching motion, so as to quickly browse and select the desired graphic item. The present application provides a method and an apparatus for operating a graphic menu bar and a recording medium using the same based on the above concept. In order to make the content of the present application more comprehensible, an embodiment is given below as an example for implementing the present application.

Figure 2:
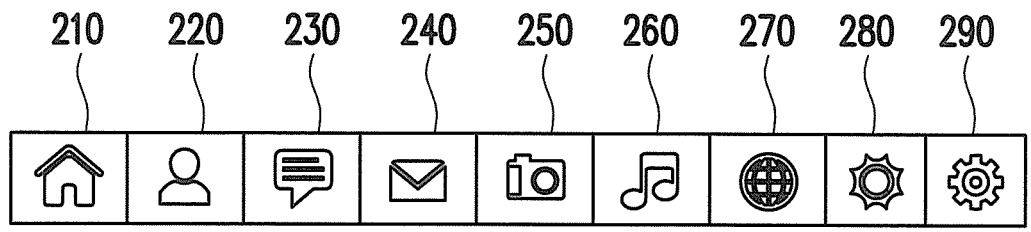
FIG. 2 is a schematic view of a graphic menu bar according to an embodiment of the present application.
Figure 3:
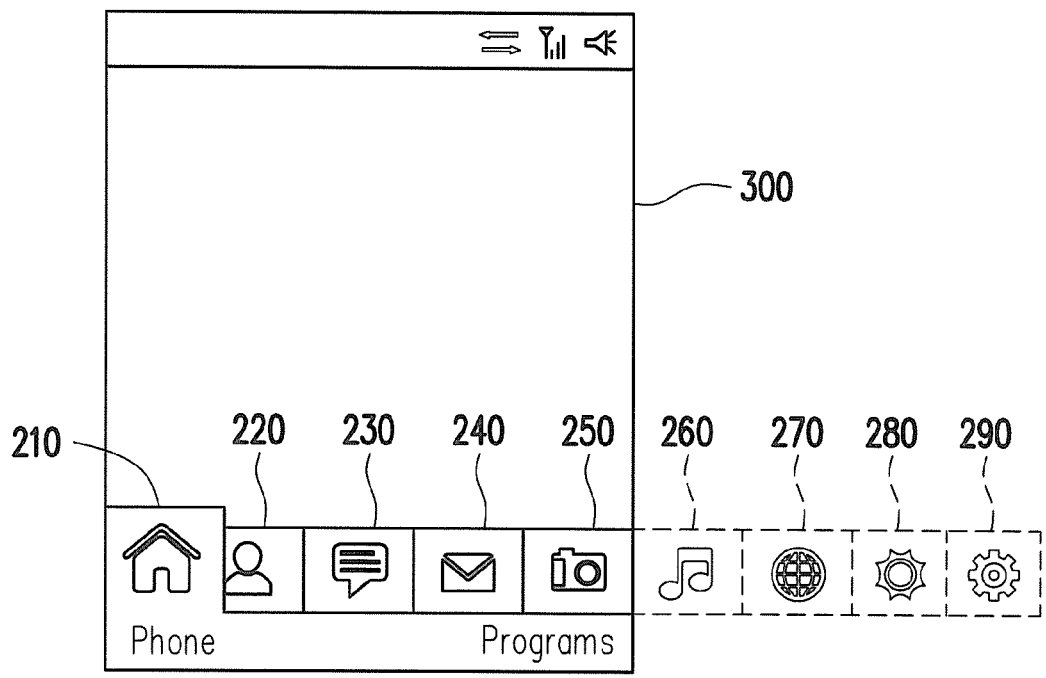
FIG. 3 is a schematic view of displaying the graphic menu bar on a touch screen according to an embodiment of the present application.

FIG. 2 is a schematic view of a graphic menu bar according to an embodiment of the present application, and FIG. 3 is a schematic view of displaying the graphic menu bar on a touch screen according to an embodiment of the present application. First, referring to FIG. 2, in this embodiment, all the functions of the portable electronic device are represented in one graphic menu bar 200, which comprises a plurality of graphic items, and they are sequentially Home 210, Contacts 220, Messages 230, Email 240, Camera 250, Music player 260, Browser 270, Weather 280, and Settings 290. The content of the graphic menu bar is only intended for exemplary illustration, but not to limit the scope of the present application. Those skilled in the art may dispose different kinds or different numbers of graphic items in the graphic menu bar depending upon the practical requirement.

Referring to FIG. 3, when the portable electronic device is activated, the graphic menu bar 200 is displayed at a bottom part of the touch screen 300. As the space of the touch screen 300 is limited, only, for example, the first five graphic items of the graphic menu bar 200 are displayed on the screen. When the user clicks a certain graphic item (for example, Home 210), the portable electronic device executes a function corresponding to the graphic item, and displays an operation interface for the function in the touch screen 300. Considering switching among the graphic items, the present application provides a corresponding operation method based on the designed architecture of the graphic menu bar, which may help the user to quickly move the graphic menu bar to browse or select the function to be executed, and an embodiment is given below for the detailed illustration.

Figure 4:
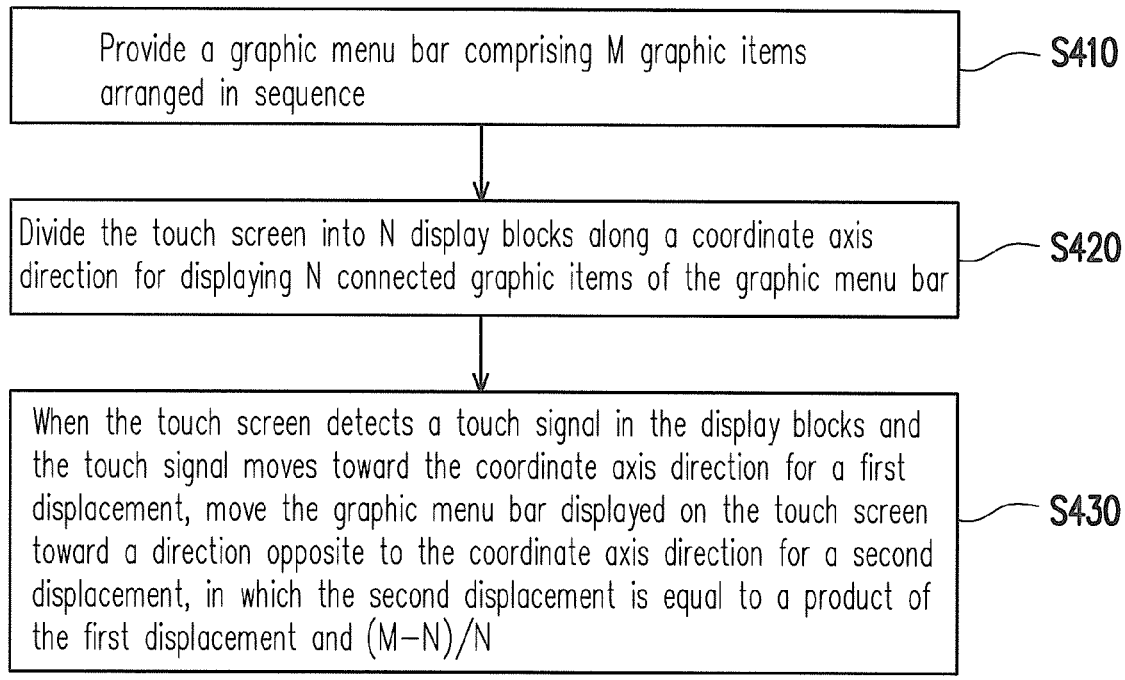
FIG. 4 is a flow chart of a method for operating a graphic menu bar according to an embodiment of the present application.

FIG. 4 is a flow chart of a method for operating a graphic menu bar according to an embodiment of the present application. Referring to FIG. 4, this embodiment is suitable for a portable electronic device having a touch screen, and the portable electronic device is, for example, a mobile phone, a PDA, a PDA phone, a navigation device, a car PC, a UMPC, a tablet PC, or a notebook, and the scope thereof is not limited.

First, a graphic menu bar is provided (Step S410). The graphic menu bar comprises M graphic items arranged in sequence, in which M is a positive integer. The number of graphic items in the graphic menu bar is, for example, determined by the number of built-in functions of the portable electronic device, determined by the number of the functions in common use, or determined by the user. The graphic item is represented by an icon relevant to the function, which is helpful for the user to browse each function of the portable electronic device. For example, Home is represented by an icon of a house, Contacts is represented by an icon of a person, and Email is represented by an icon of an envelope.

Next, the portable electronic device divides the touch screen into N display blocks along a coordinate axis direction, and displays N connected graphic items of the graphic menu bar in the display blocks, in which N is a positive integer smaller than M (Step S420). For example, five graphic items are displayed in the touch screen of FIG. 3. The coordinate axis direction takes the plane of the touch screen as a reference, which may be a horizontal direction or a vertical direction.

According to the configuration of the display blocks, the touch screen continuously detects the touching motion made by the user in the display blocks, so as to generate corresponding touch signals. When the touch screen detects a touch signal in the display block, and determines that the touch signal moves towards the coordinate axis direction for a first displacement, the portable electronic device moves the graphic menu bar displayed on the touch screen towards a direction opposite to the coordinate axis direction for a second displacement (Step S430). The second displacement is equal to the product of the first displacement and $(M-N)/N$. Since M is greater than N, the moving speed of the graphic menu bar is higher than the speed for the user's finger to slide on the touch screen, so that the user can operate all the graphic items in the graphic menu bar through one touching motion.

It should be noted that each time when the touch screen detects a touch signal, the portable electronic device enlarged displays the graphic item where the touch signal is located or marks it up through other manners, thereby reminding the user about the currently touched or clicked graphic item, for example, Home 210 shown in FIG. 3. If the user touches the touch screen and releases immediately, it indicates that he/she intends to select the graphic item. At this time, the touch signal detected by the touch screen is terminated, and the portable electronic device executes the function corresponding to the graphic item. In another aspect, if the user touches and drags towards the coordinate axis direction or the opposite direction thereof, it represents that he/she intends to browse or switch to other graphic items. At this time, the portable electronic device moves the graphic menu bar towards the direction opposite to the moving direction of the touch signal.

Figure 5A:
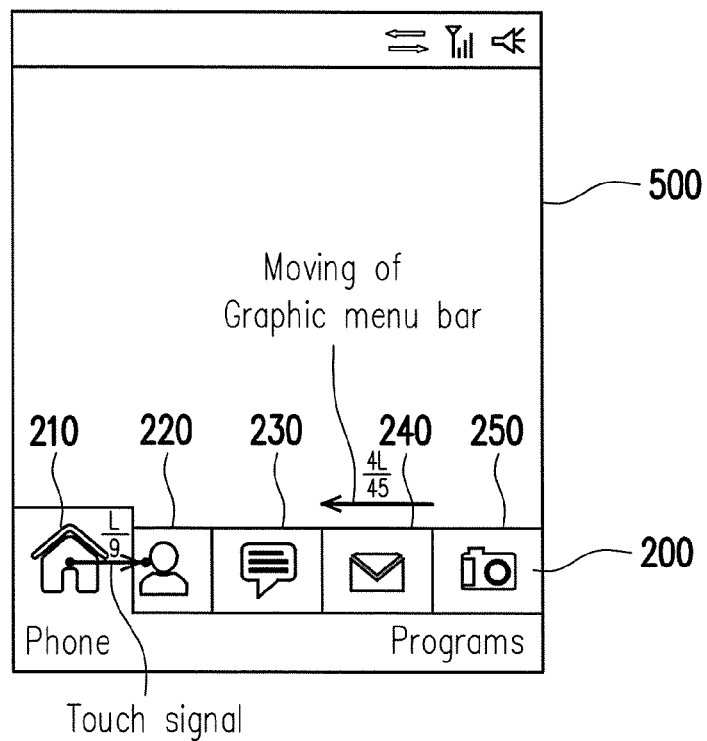
FIGS. 5A and 5B are schematic views of the method for operating a graphic menu bar according to an embodiment of the present application.
Figure 5B:
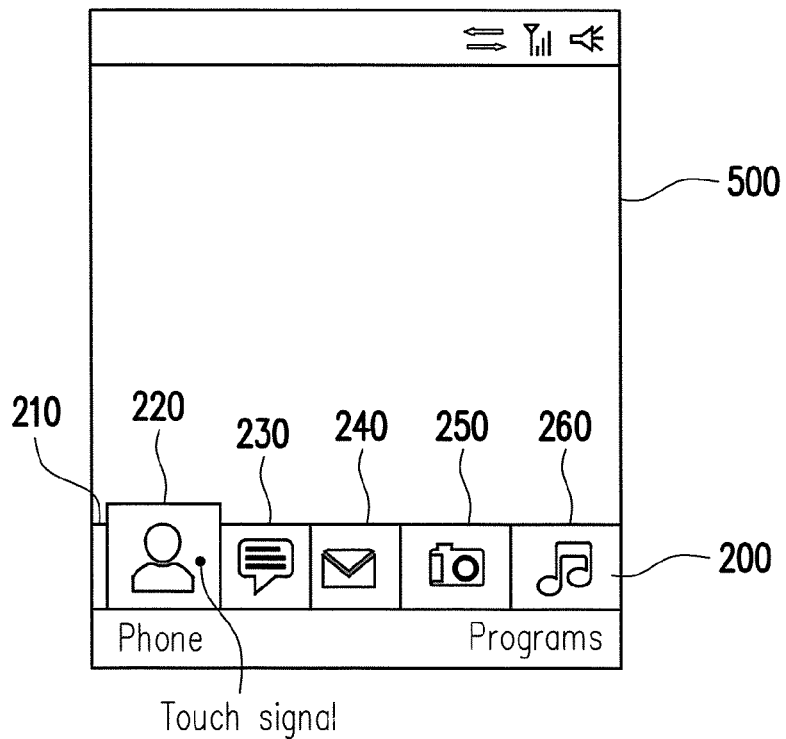

For example, FIGS. 5A and 5B are schematic views of the method for operating a graphic menu bar according to an embodiment of the present application. First, referring to FIG. 5A, in this embodiment, it is assumed that the width of the touch screen 500 is L, and the touch screen 500 is divided into five display blocks, for pre-displaying the first five graphic items (totally nine graphic items). At this time, if the user touches Home 210 and slides rightwards for a distance of L/9, the whole graphic menu bar 200 is correspondingly moved leftwards for a distance of $L/9\times(9-5)/5=4L/45$. At this time, for example, the graphic item of Home 210 on the touch screen 500 disappears from the left side, and the graphic item of Music player 260 appears from the right side (as shown in FIG. 5B). In another aspect, at this time, the position of the touch signal falls on the graphic item of Contacts 220, so the portable electronic device enlarged displays the graphic item of Contacts 220, and meanwhile displays the user interface corresponding to Contacts 220 above the graphic menu bar 200.

In addition, in another embodiment of the present application, when the position of the touch signal falls on the graphic item of Contacts 220, the icon of Contacts 220 is first displayed above the graphic menu bar 200, which may be, for example, an enlarged graphic item of Contacts 220 together with a text description, for example "Contact." Then, when the touch signal is terminated at Contacts 220 and the portable electronic device executes the function corresponding to the graphic item of Contacts 220, the user interface of Contacts 220 is displayed above the graphic menu bar 200.

Similarly, when the user slides from Home 210 towards right for a distance of 2L/9, the graphic menu bar 200 correspondingly moves towards left for a distance of $2L/9\times(9-5)/5=8L/45$. At this time, the graphic item of Contacts 220 disappears from the left side, and the graphic item of Browser 270 appears from the right side, and so forth. Once the user slides for a distance of L, the graphic menu bar 200 has been moved to the final graphic item (Setting 290). To sum up, in the definition of displacements, the weight of the graphic menu bar is lower, so the user visually feels that the moving speed of the graphic menu bar 200 is lower than the touching and dragging speed with the finger.

In addition, although the movement of the graphic menu bar 200 is controlled by touching the graphic item of Home 210 and sliding rightwards in the above embodiment, the method of the present application is also suitable for touching other graphic items in the graphic menu bar 200 and sliding leftwards or rightwards, and the operating principle thereof is the same as that of the above embodiment, so it is not repeatedly described herein.

Figure 6:
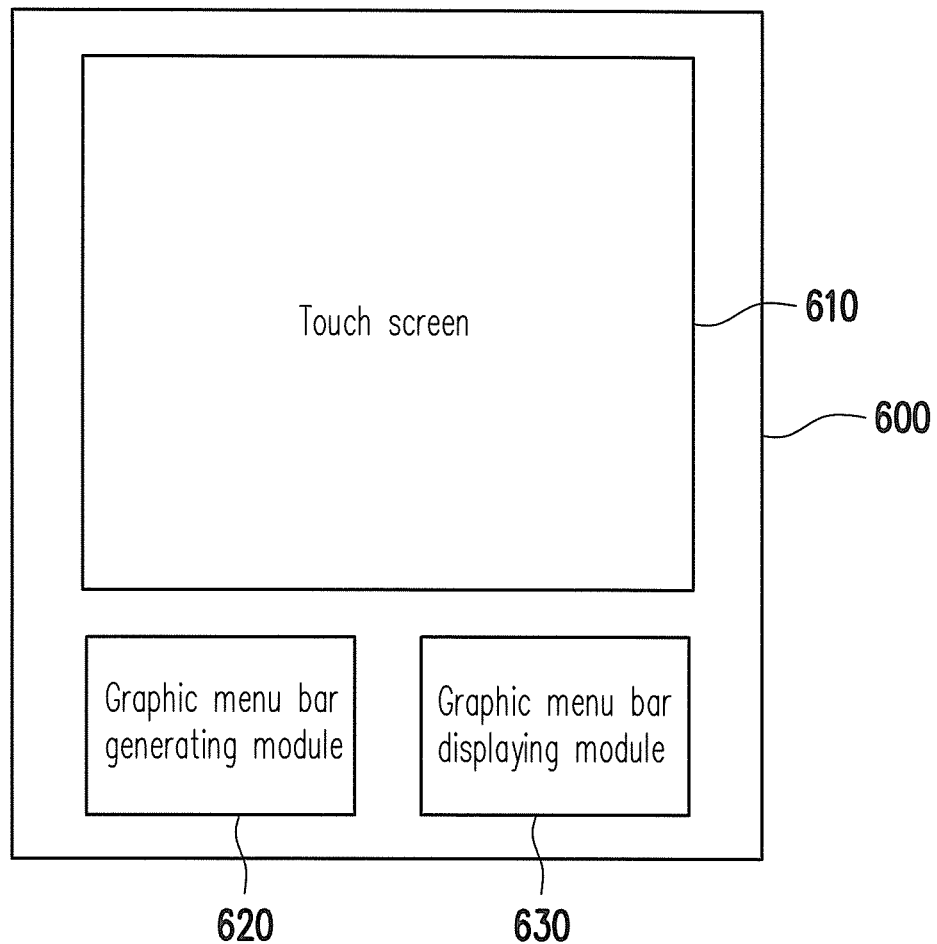
FIG. 6 is a block diagram of an apparatus for operating a graphic menu bar according to an embodiment of the present application.

In another aspect, the present application further comprises a physical apparatus for realizing the above operating method, and an embodiment is given below for detailed illustration. FIG. 6 is a block diagram of an apparatus for operating a graphic menu bar according to an embodiment of the present application. Referring to FIG. 6, an apparatus 600 in this embodiment is, for example, a mobile phone, a PDA, a PDA phone, a navigation device, a car PC, a UMPC, a tablet PC, or a notebook, and the scope thereof is not limited herein. The apparatus 600 comprises a touch screen 610, a graphic menu bar generating module 620, and a graphic menu bar displaying module 630, and their respective functions are described as follows.

The touch screen 610 is used to detect a touching motion made by the user, so as to generate a corresponding touch signal. The graphic menu bar generating module 620 is used to generate the graphic menu bar, which comprises M graphic items arranged in sequence, and M is a positive integer. The graphic menu bar generating module 620 generates a patterned graphic menu bar comprising graphic items representing various function of the portable electronic device, which is provided for the user to browse and select the function to be executed.

In addition, the graphic menu bar displaying module 630 divides the touch screen 610 into N display blocks along the coordinate axis direction, so as to display N connected graphic items of the graphic menu bar in the display blocks, and correspondingly moves the graphic menu bar according to the touch signal detected by the touch screen 610, in which N is a positive integer smaller than M.

Particularly, when the touch screen 610 detects a touch signal in the display blocks and the touch signal moves towards the coordinate axis direction for a first displacement, the graphic menu bar displaying module 630 moves the graphic menu bar towards a direction opposite to the coordinate axis direction for a second displacement, and the second displacement is equal to the product of the first displacement and (M−N)/N. Accordingly, the apparatus 600 in this embodiment enables the user to quickly move the graphic menu bar to search among the graphic items, so as to execute the desired function.

It should be noted that, when the touch screen 610 detects the touch signal, the graphic menu bar displaying module further enlarged displays the graphic item where the touch signal is located, so as to remind the user about the currently touched graphic item. In addition, the touch screen 610 further detects whether the touch signal moves towards the coordinate axis direction or the opposite direction, and then the graphic menu bar displaying module 630 moves the graphic menu bar towards the direction opposite to the moving direction of the touch signal, according to a detecting result of the touch screen 610.

In addition, the apparatus 600 of the present application further comprises a user interface displaying module (not shown), for displaying a user interface corresponding to the graphic item where the touch signal is located above the graphic menu bar. Alternatively, the user interface displaying module first displays an icon corresponding to the graphic item where the touch signal is located above the graphic menu bar, which may be, for example, an enlarged graphic item of Contacts 220 together with a text description, for example "Contact." Then, when the touch signal is terminated, a user interface corresponding to the graphic item where the touch signal is located is displayed above the graphic menu bar. In another aspect, the apparatus 600 of the present application further comprises a function executing module, which is used for executing a function corresponding to the graphic item where the touch signal is located when the touch signal is terminated.

In addition, the present application further provides a recording medium (for example, an optical disk, a floppy disc, and a removable hard drive), which records a computer readable authority approval program, so as to execute the method for operating a graphic menu bar. Here, the authority approval program recorded on the recording medium is generally formed by a plurality of program code fragments (for example, program code fragment for organization chart establishment, program code fragment for approval sheet, setting program code fragment, and deployment program code fragment), and the functions of the program code fragments are corresponding to the steps of the operating method and the block diagram of the functions of the operating apparatus.

To sum up, in the method and apparatus for operating a graphic menu bar and the recording medium using the same of the present application, the graphic menu bar is moved by detecting the touching motion made by the user on the touch screen, and according to the difference between the touching motion with the human finger and the visual sensitivity of human eyes, a proportional relation between the displacement of the touching motion and that of the graphic menu bar is appropriately adjusted, such that the user can view all the graphic items with one touching motion, so as to operate a larger number of graphic items within the limited touching area, thereby quickly browsing and selecting the graphic items.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A method for operating a graphic menu bar, suitable for a portable electronic device having a touch screen, comprising:
    providing a graphic menu bar, which comprises M graphic items arranged in sequence, wherein M is a positive integer, wherein each graphic item represents a different user interface with a different function;
    displaying N connected graphic items of the M graphic items along a coordinate axis direction in the graphic menu bar on the touch screen, wherein N is a positive integer smaller than M;
    in response to detecting a touch signal in a first graphic item at one end of the graphic menu bar on the touch screen, wherein the first graphic item at one end is the first one of the graphic items and displayed at one end of the touch screen, and in response to detecting the touch signal is moved toward the coordinate axis direction and ended at the other end of the touch screen, moving the graphic menu bar displayed on the touch screen along a direction opposite to the coordinate axis direction so as to switch to display a second graphic item at the other end of the graphic menu bar at the other end of the touch screen, wherein the second graphic item at the other end is the last one of the graphic items and the second graphic item is displayed on the other end of the touch screen after the movement of the graphic menu bar and not displayed before the movement of the graphic menu bar, wherein the first graphic item is displayed before the movement of the graphic menu bar and not displayed after the movement of the graphic menu bar, and wherein the first graphic item at one end of the graphic menu bar and the second graphic item at the other end of the graphic menu bar are not connected to each other; and
    in response to detecting the touch signal is terminated at the second graphic item, switching to a user interface corresponding to the second graphic item.

2. The method according to claim 1, further comprises:
    in response to detecting the touch signal is located on the first graphic item, enlarged displaying the first graphic item.

3. The method according to claim 1, further comprises:
    in response to detecting the touch signal is located on the first graphic item, displaying an icon corresponding to the first graphic item above the graphic menu bar.

4. The method according to claim 1, further comprises:
    in response to detecting the touch signal is located on the first graphic item, displaying a text description corresponding to the first graphic item above the graphic menu bar.

5. The method according to claim 1, further comprising:
    executing a function corresponding to the second graphic item where the touch signal is terminated.

6. A non-transitory recording medium, suitable for recording a computer program, wherein the computer program comprises a plurality of program codes, which is loaded into a portable electronic device to execute a method for operating a graphic menu bar which comprises:

providing a graphic menu bar, which comprises M graphic items arranged in sequence, wherein M is a positive integer, wherein each graphic item represents a different user interface with a different function;

displaying N connected graphic items of the M graphic items along a coordinate axis direction in the graphic menu bar on the touch screen, wherein N is a positive integer smaller than M;

in response to detecting a touch signal in a first graphic item at one end of the graphic menu bar on the touch screen, wherein the first graphic item at one end is the first one of the graphic items and displayed at one end of the touch screen, and in response to detecting the touch signal is moved toward the coordinate axis direction and ended at the other end of the touch screen, moving the graphic menu bar displayed on the touch screen along a direction opposite to the coordinate axis direction so as to switch to display a second graphic item at the other end of the graphic menu bar at the other end of the touch screen, wherein the second graphic item at the other end is the last one of the graphic items and the second graphic item is displayed on the other end of the touch screen after the movement of the graphic menu bar and not displayed before the movement of the graphic menu bar, wherein the first graphic item is displayed before the movement of the graphic menu bar and not displayed after the movement of the graphic menu bar, and wherein the first graphic item at one end of the graphic menu bar and the second graphic item at the other end of the graphic menu bar are not connected to each other; and in response to detecting the touch signal is terminated at the second graphic item, switching to a user interface corresponding to the second graphic item.

7. An apparatus for operating a graphic menu bar, comprising:

a touch screen, for detecting a touch signal;

a graphic menu bar generating module, for generating a graphic menu bar, wherein the graphic menu bar comprises M graphic items arranged in sequence, wherein M is a positive integer, wherein each graphic item represents a different user interface with a different function; and a graphic menu bar display module, for displaying N connected graphic items of the M graphic items along a coordinate axis direction in the graphic menu bar on the touch screen, wherein N is a positive integer smaller than M;

a user interface displaying module, for displaying a user interface corresponding to the graphic item where the touch signal is terminated at the graphic menu bar; and wherein in response to detecting the touch signal in a first graphic item at one end of the graphic menu bar, wherein the first graphic item at one end is the first one of the graphic items and displayed at one end of the touch screen, and in response to detecting the touch signal is moved toward the coordinate axis direction and ended at the other end of the touch screen, the graphic menu bar displayed on the touch screen is moved toward a direction opposite to the coordinate axis direction so as to switch to display a second graphic item at the other end of the graphic menu bar at the other end of the touch screen, wherein the second graphic item at the other end is the last one of the graphic items and the second graphic item is displayed on the other end of the touch screen after the movement of the graphic menu bar and not displayed before the movement of the graphic menu bar, wherein the first graphic item is displayed before the movement of the graphic menu bar and not displayed after the movement of the graphic menu bar, and wherein the first graphic item at one end of the graphic menu bar and the second graphic item at the other end of the graphic menu bar are not connected to each other, and wherein in response to detecting the touch signal is terminated at the second graphic item, the user interface displaying module displays a user interface corresponding to the second graphic item.

8. The apparatus according to claim 7, wherein the user interface displaying module further enlarged displays the graphic item where the touch signal is located.

9. The apparatus according to claim 7, wherein the user interface displaying module further displays an icon corresponding to the graphic item where the touch signal is located above the graphic menu bar.

10. The apparatus according to claim 7, wherein the user interface displaying module further displays a text description corresponding to the graphic item where the touch signal is located above the graphic menu bar.

11. The apparatus according to claim 7, further comprising a function executing module, which is used for executing a function corresponding to the graphic item where the touch signal is terminated.

\* \* \* \* \*